Feb. 3, 1959  A. WALSH  2,871,757
MONOCHROMATOR

Filed March 25, 1954  3 Sheets-Sheet 1

Feb. 3, 1959  A. WALSH  2,871,757
MONOCHROMATOR
Filed March 25, 1954  3 Sheets-Sheet 2
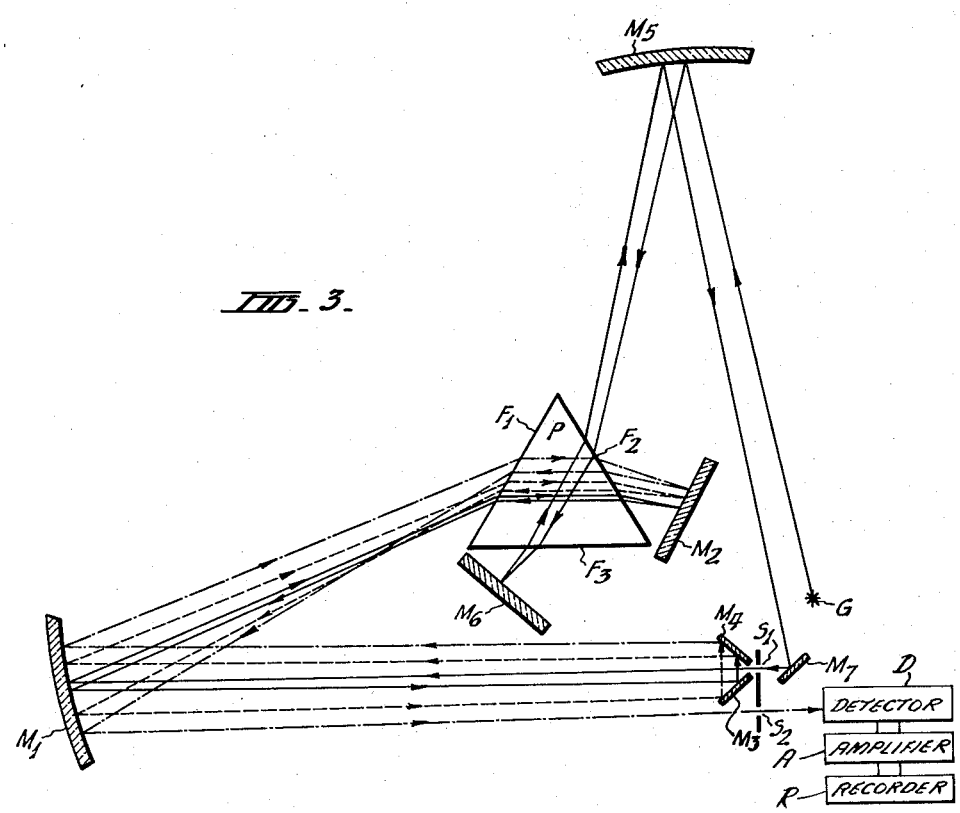

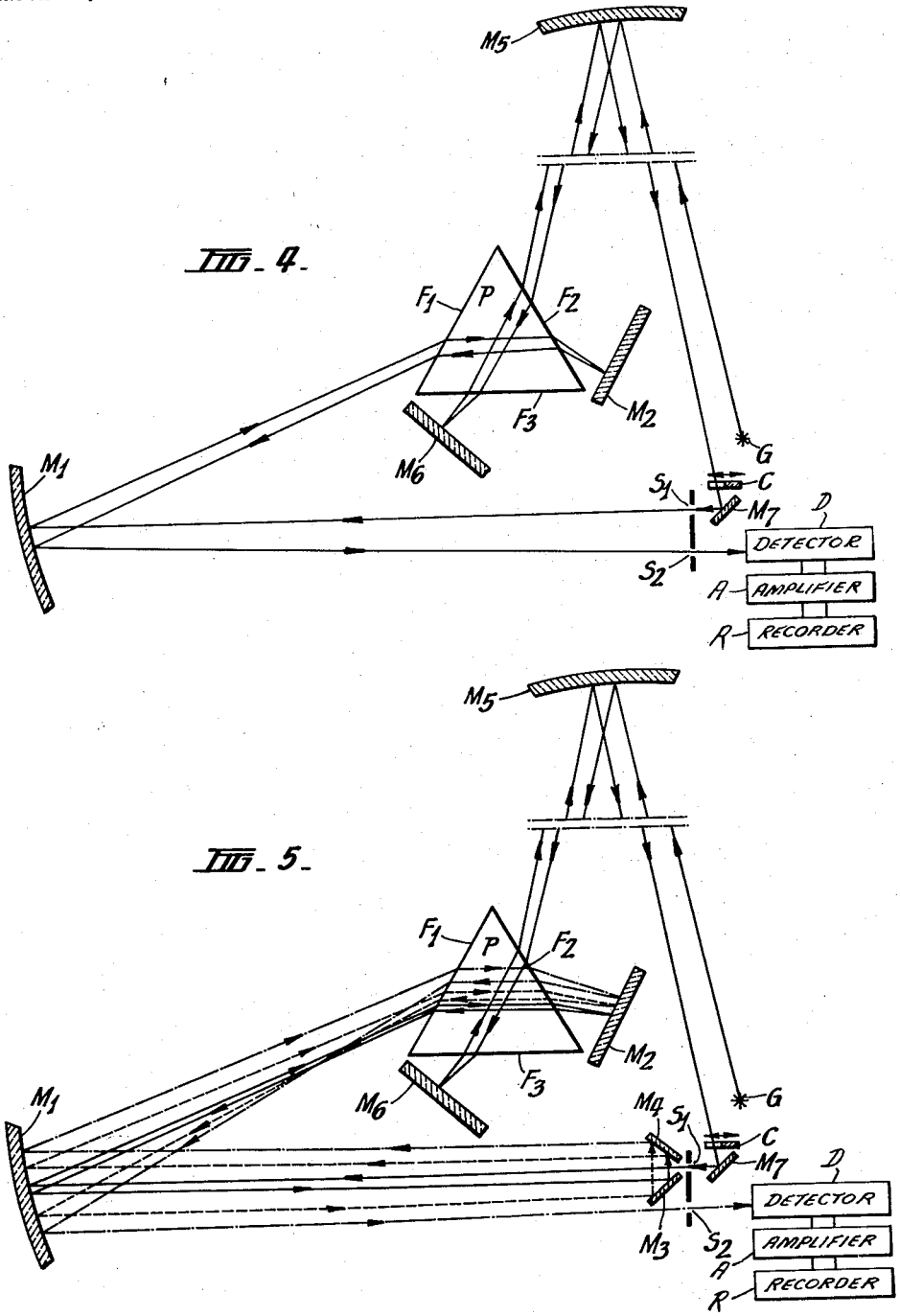

United States Patent Office 2,871,757
Patented Feb. 3, 1959

2,871,757
MONOCHROMATOR

Alan Walsh, Canterbury, Victoria, Australia, assignor to Commonwealth Scientific and Industrial Research Organization, East Melbourne, Victoria, Australia, a body corporate Application March 25, 1954, Serial No. 418,702

Claims priority, application Australia May 12, 1953

7 Claims. (Cl. 88—14)

This invention relates to monochromators and its main object is to provide a multiple monochromator having much higher resolving power than a conventional single monochromator and giving a large reduction in scattered radiation.

It is known to couple two monochromators in series to form a double monochromator, but this is cumbersome and expensive because monochromators are costly instruments. Also it is difficult to couple them together accurately. We are not aware of any previous coupling together of more than two monochromators.

We have recently developed a multiple monochromator by modifying a monochromator in such a way that radiation passes more than once through the optical system of said monochromator before passing through the exit slit of the monochromator. However, in order to isolate the required radiation, it is necessary to place a radiation chopper within the monochromator to interrupt only the required radiation at a given frequency, the output of the detector being amplified by an amplifier tuned to said frequency. This multiple monochromator forms the subject of U. S. Patent No. 2,652,742.

Another object of the present invention is to change a single monochromator in a simple manner to a multiple monochromator in such a way that it becomes possible to obtain a continuous (i. e., unchopped) output from the monochromator.

While this invention is applicable to many types of monochromators in which a prism is employed, it is of particular value in the case of monochromators employing a prism in conjunction with mirrors. It will therefore be described primarily in relation to a monochromator employing mirrors and a prism.

In the present invention the radiation from the source passes through the prism of the monochromator before it passes through the conventional entrance slit of the monochromator so that a range of wavelengths of only narrow band-width passes through said entrance slit. In its passage through the prism before reaching the entrance slit of the monochromator the radiation is refracted at two of the prism faces, whereas the radiation which passes through the entrance slit is refracted at one of these two faces and at the third face which was not traversed by the radiation during its traversal of the prism before reaching the entrance slit.

Figure 1:
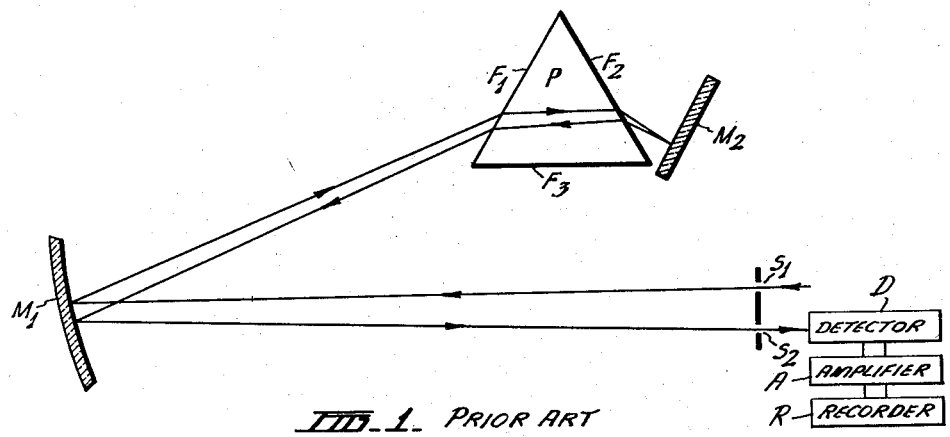
Figure 2:
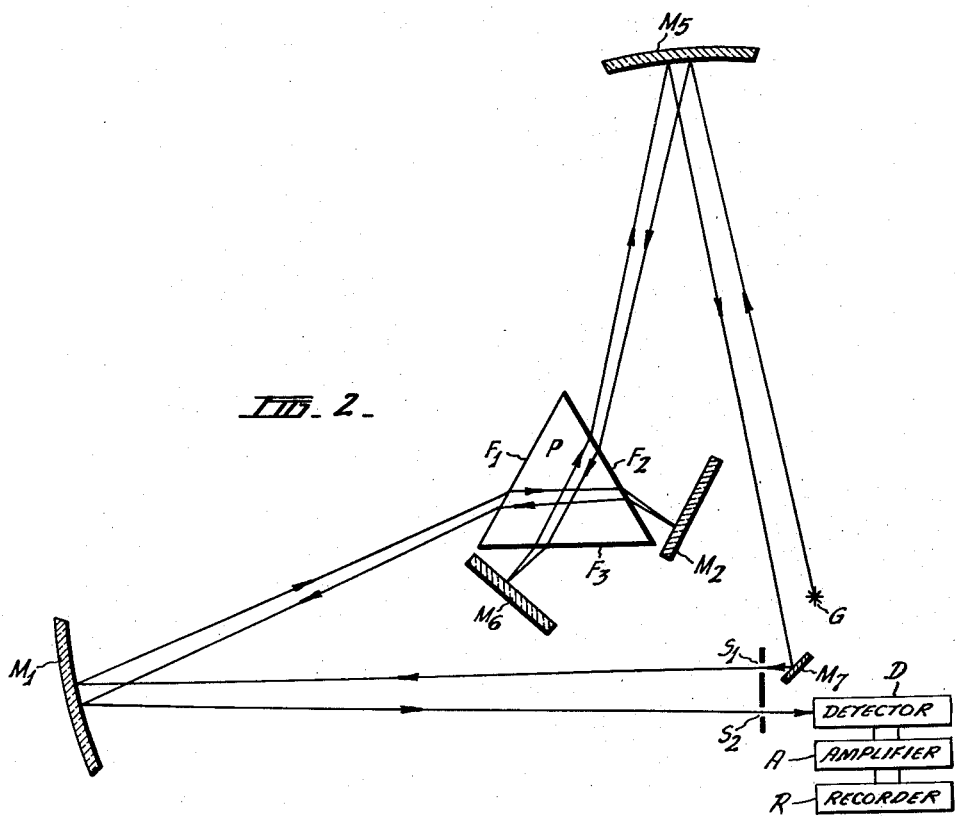

Fig. 1 is a schematic representation of the optical system of a conventional monochromator;

Fig. 2 schematically represents the modification of the conventional monochromator shown in Fig. 1 in accordance with the present invention in order to form a double monochromator;

Fig. 3 schematically represents a further modification of the conventional monochromator in accordance with the present invention in order to form a quadruple monochromator;

Fig. 4 schematically represents the optical system of Fig. 2, but with a chopper added thereto; and Fig. 5 schematically shows the optical system of Fig. 3, but with a chopper added to that optical system.

The optical system of a conventional, single monochromator is shown in Figure 1 of the drawings. Radiation from the source G is focussed on the entrance slit $S_1$ and is collimated by the off-axis paraboloid mirror $M_1$. The collimated beam is dispersed by the prism P and reflected back through the prism by the plane mirror $M_2$. After further dispersion by the prism P the beam falls on the mirror $M_1$ which focusses radiation of a given frequency on the exit slit $S_2$. The emergent beam is then focussed on a detector D, and the output from the latter is then received by an amplifier A and fed to a recorder R. In this conventional arrangement the radiation traverses the prism faces $F_1$ and $F_2$ but does not traverse the prism face $F_3$.

For a given setting of the mirror $M_2$ radiation of a wavelength extending from $\lambda_1 - \Delta\lambda_1$ to $\lambda_1 + \Delta\lambda_1$ (i. e., radiation of band-width $2\Delta\lambda_1$) passes through the exit slit, the band-width $2\Delta\lambda_1$ being determined by the slit widths and by the resolution of the optical system.

A practical embodiment of this invention and a refinement thereof are shown in Figures 2 and 3 respectively.

Referring now to Figure 2 of the drawings, radiation from the source is made to pass through the prism before passing through the entrance slit of the monochromator by the inclusion of additional components in the optical system. G is the source of radiation, $M_5$ is a mirror similar to $M_1$, $M_6$ is a plane Littrow mirror similar to $M_2$, and $M_7$ is a plane mirror. In the arrangement of Fig. 2, the relative dispositions of the source G, the mirror $M_5$, and the prism face $F_2$ are substantially the same as those of the entrance slit $S_1$, the mirror $M_1$ and the prism face $F_1$. The mirror $M_6$ is arranged so that radiation of mean wavelength $\lambda_1$ and band-width $2\Delta'\lambda_1$ falls on the entrance slit $S_1$. The mirror $M_2$ is arranged so that radiation from this wavelength range which passes through the entrance slit will also pass through the exit slit $S_2$. The band-width $2\Delta'\lambda_1$ can be greater than the band-width $2\Delta\lambda_1$ embraced by the exit slit $S_2$, and so the mirror $M_5$ need not be an off-axis paraboloid but may be a spherical concave mirror.

As it is arranged that only a small band-width, $2\Delta'\lambda_1$ can pass through the entrance slit, the amount of unwanted radiation which can pass through the exit slit $S_2$ is much smaller than when undispersed radiation falls on the entrance slit.

If additional plane mirrors $M_3$, $M_4$ at right angles to each other are placed, for instance, on each side of the entrance slit, as shown in Figure 3 of the drawings, the mirror $M_6$ or $M_2$ can be partially rotated so that the radiation which passes through entrance slit $S_1$ will pass several times through the optical system of the monochromator before passing through the exit slit $S_2$, as in the multiple monochromator forming the subject of U. S. Patent No. 2,652,742. By this means a spectrum of increased resolution is obtained. An internal chopper adapted to isolate the required radiation could be used but, as the band-width of the radiation which passes through the entrance slit is fairly narrow, an internal chopper is not really necessary.

Using monochromators for measuring the distribution of intensity in a spectrum, a chopper is sometimes placed between the source and the entrance slit of the monochromator to interrupt at a given frequency the incident beam, and the output of the amplifier A used to amplify the output from the detector D of the radiation emerging from the exit slit is tuned to the same frequency; thus, any variations, such as those due to thermal drift, which are not thus interrupted are eliminated. In the present invention also, a chopper may be placed immediately in front of (i. e. outside) the entrance slit for this purpose. A chopper so placed serves also to eliminate the effect of any radiation scattered when the radiation first passes through the prism, such scattered radiation being uninterrupted and, consequently, not recorded. The positioning of such a chopper C in the arrangements of Figs. 2 and 3 is illustrated in Figs. 4 and 5, respectively.

This invention has been described primarily by reference to a specific type of monochromator, but obviously the same principle can be applied to other types of monochromator incorporating a prism. For example, it would be possible to replace the mirror $M_2$ by a plane reflecting diffraction grating. The manner in which the Littrow mirror $M_2$ may be replaced by a plane diffraction grating will be obvious to those skilled in the art. When such replacements are effected, the optical arrangements will be the same as those shown in Figs. 2, 3, 4 and 5, respectively, of the drawings, with the sole exception that the elements $M_2$ will then be in the form of a diffraction grating. The small band width passing through the slit $S_1$ and through the prism T will fall on the plane diffraction grating at $M_2$, and the position of the grating will be arranged so that the diffracted beam will pass through the prism T and be reflected by the mirror $M_1$ for passage through the exit slit $S_2$.

I claim:

1. In a single monochromator; the combination of a prism, an entrance slit, an exit slit, a dispersion system operative to direct radiation from said entrance slit through said prism for refraction at only two of the faces of said prism and to return radiation of a selected wavelength back to said exit slit, a source of radiation, a first mirror arranged to direct a substantially collimated beam of radiation directly from said source through said prism for refraction at one of said two faces of the prism and at a third face of the latter, a second mirror arranged to reflect the dispersed beam of radiation emitted from said prism so that said dispersed beam of radiation again passes through said third face and said one of the two faces of the prism and is reflected against said first mirror, and a third mirror disposed to receive the dispersed radiation reflected by said first mirror and to direct a range of wavelengths of only narrow band-width through said entrance slit, so that said dispersion system operates only on said range of wave-lengths of narrow band-widths thereby to substantially reduce the amount of unwanted radiation that can pass through said exit slit.

2. In combination with a single monochromator having a prism, an entrance slit, an exit slit, a dispersion system operative to direct radiation from said entrance slit through said prism for refraction at only two of the faces of said prism and to return radiation of a selected wavelength back to said exit slit, detecting means responsive to the radiation passing through said exit slit, and means for recording the detected radiation; a source of radiation, means operative to pass radiation directly from said source through said prism for refraction at one of said two faces of the latter and at a third face of the prism, thereby to disperse the radiation from said source, and means operative to pass the dispersed radiation from said source back through said one face and said third face of the prism and then to direct a range of wave-lengths of only narrow band-width through said entrance slit, so that said dispersion system operates only on said range of wavelengths of narrow band-widths, thereby to substantially reduce the amount of unwanted radiation that can pass through said exit slit.

3. The combination as in claim 2; further comprising a pair of plane mirrors at right angles to each other and arranged within said dispersion system to cause the radiation passing through said entrance slit to traverse said two faces of the prism a plurality of times before passing through said exit slit, thereby to obtain a spectrum of increased resolution.

4. The combination as in claim 3; further comprising a chopper disposed immediately in front of said entrance slit to interrupt the radiation directed through entrance slit at a selected frequency, and an amplifier receiving the output from said detecting means and tuned to said selected frequency.

5. The combination as in claim 3; further comprising a chopper disposed in front of said pair of plane mirrors and operating at a selected frequency, and an amplifier receiving the output of said detecting means and tuned to said selected frequency.

6. The combination as in claim 2; a chopper disposed immediately in front of said entrance slit to interrupt the radiation directed through the latter at a selected frequency, and an amplifier receiving the output from said detecting means and tuned to said selected frequency.

7. The combination as in claim 2; wherein said means operative to pass radiation directly from said source through said prism includes a first mirror arranged to reflect a substantially collimated beam of radiation from said source through said one face and said third face of the prism; and wherein said means operative to pass the dispersed radiation back through said prism includes a second mirror disposed to reflect the dispersed beam of radiation back through said one face and said third face to fall again on said first mirror, and a third mirror arranged to receive the dispersed radiation through said entrance slit.

References Cited in the file of this patent

UNITED STATES PATENTS

| | | |
|---|---|---|
| 2,502,319 | Golay | Mar. 28, 1950 |
| 2,652,742 | Walsh | Sept. 22, 1953 |

OTHER REFERENCES

Spectroscopy, E. C. C., Baly, vol. 1, Third Edition, published in 1924 by Longmans, Green and Co., New York City, pages 107 and 108 cited.